United States Patent
Robbins et al.

(10) Patent No.: US 12,175,228 B2
(45) Date of Patent: Dec. 24, 2024

(54) NOTIFICATION BASED SOFTWARE MANAGEMENT VIA CONNECTED DEVICES

(71) Applicant: Dell Products L.P., Round Rock, TX (US)

(72) Inventors: Joshua Robbins, Celina, TX (US); Karthik Vinnakota, Round Rock, TX (US); Jonathan Yanez, Allen, TX (US); Nagesh Maddala, Plano, TX (US)

(73) Assignee: Dell Products L.P., Round Rock, TX (US)

( * ) Notice: Subject to any disclaimer, the term of this patent is extended or adjusted under 35 U.S.C. 154(b) by 493 days.

(21) Appl. No.: 17/496,355

(22) Filed: Oct. 7, 2021

(65) Prior Publication Data

US 2023/0112219 A1 Apr. 13, 2023

(51) Int. Cl.
*G06F 8/65* (2018.01)
*G06F 11/14* (2006.01)
*G06F 21/57* (2013.01)

(52) U.S. Cl.
CPC ............ *G06F 8/65* (2013.01); *G06F 11/1433* (2013.01); *G06F 21/57* (2013.01)

(58) Field of Classification Search
CPC ......... G06F 8/65; G06F 11/1433; G06F 21/57
See application file for complete search history.

(56) References Cited

U.S. PATENT DOCUMENTS

| | | | |
|---|---|---|---|
| 8,745,636 B2 | 6/2014 | Quintanilla et al. | |
| 11,023,222 B1 | 6/2021 | Sethi et al. | |
| 2010/0107150 A1* | 4/2010 | Kamada | H04M 1/72472 715/822 |
| 2014/0173586 A1* | 6/2014 | Dugan | G06F 8/65 717/173 |
| 2016/0013934 A1* | 1/2016 | Smereka | H04W 12/033 713/171 |
| 2017/0364349 A1* | 12/2017 | Conant | G06F 8/60 |
| 2019/0220265 A1* | 7/2019 | Willis | H04W 76/10 |
| 2020/0201622 A1* | 6/2020 | Tsujimura | G06F 8/71 |
| 2021/0334089 A1* | 10/2021 | Graham | G06F 21/30 |

* cited by examiner

*Primary Examiner* — S. Sough
*Assistant Examiner* — Cheneca Smith
(74) *Attorney, Agent, or Firm* — Larson Newman, LLP

(57) ABSTRACT

An information handling system includes a memory that stores a registry with a multiple fields for applications executed in the information handling system. A processor receives an update for a monitored application of the applications. In response to the update being received, the processor updates one of the fields of the registry to indicate that the update is available for the first application. Based on the one of the fields being updated, the processor determines an idle time of the information handling system. During the idle time, the processor provides an update request to a trusted device and determines whether an update request confirmation has been received from the trusted device. In response to the update request confirmation being received, the processor performs the update for each application that requires an update.

17 Claims, 5 Drawing Sheets

NOTIFICATION BASED SOFTWARE MANAGEMENT VIA CONNECTED DEVICES

FIELD OF THE DISCLOSURE

The present disclosure generally relates to a notification based software management via connected devices in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a memory that may store a registry with a multiple fields for applications executed in the information handling system. A processor may receive an update for a monitored application. In response to the update being received, the processor may update one of the fields of the registry to indicate that an update is available. Based on the one of the fields being updated, the processor may determine an idle time of the information handling system. During the idle time, the processor may provide an update request to a trusted device and determine whether an update request confirmation has been received from the trusted device. In response to the update request confirmation being received, the processor may perform the update for each application that requires an update.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
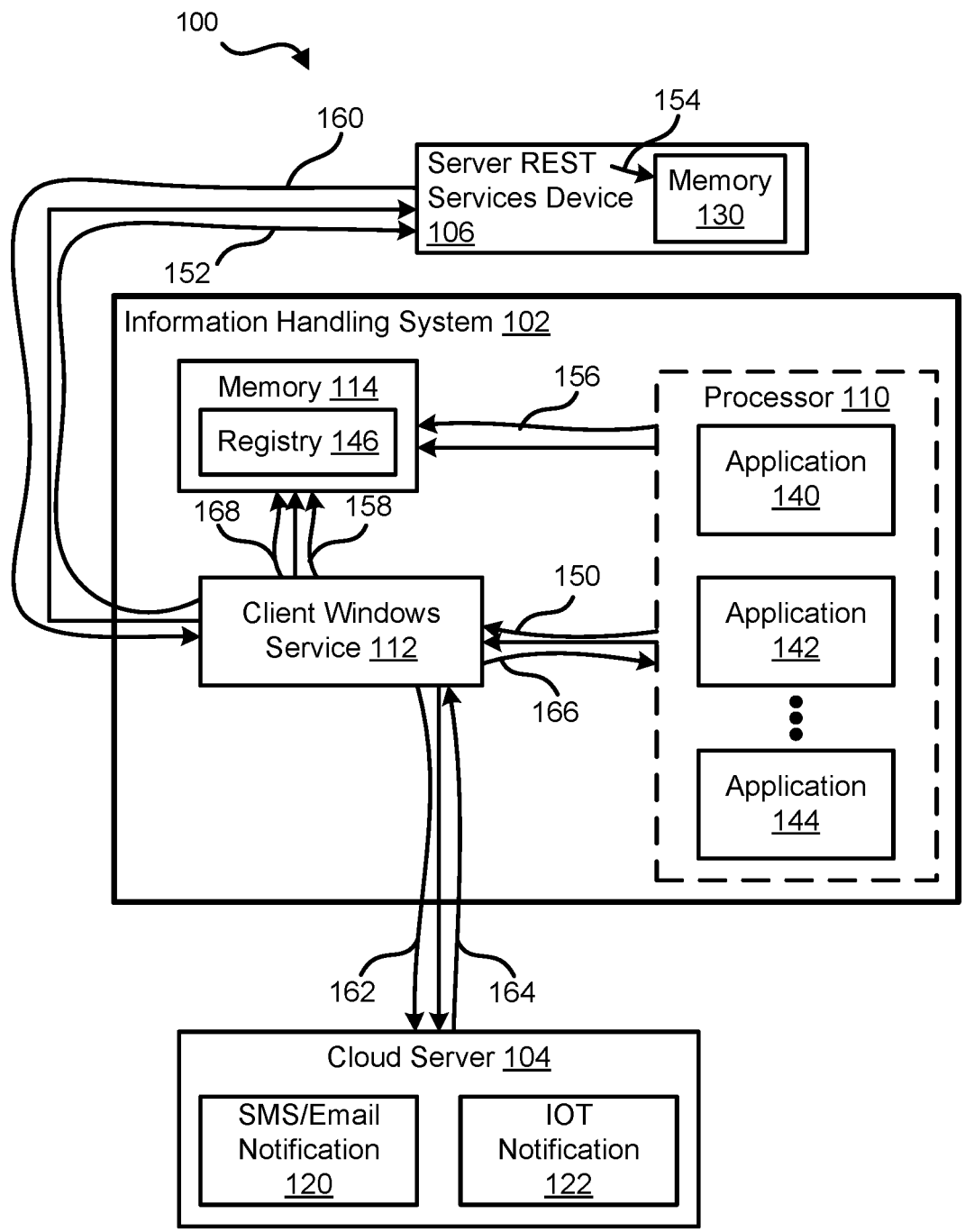
FIG. 1 is a diagram of a portion of a software management system including an information handling system according to at least one embodiment of the present disclosure.

FIG. 1 illustrates of a portion of a software management system 100 according to at least one embodiment of the present disclosure. Software management system 100 includes an information handling system 102, a cloud server 104, and a server rest services device 106. Information handling system 102 includes a processor 110, a client windows service 112, and a memory 114. Cloud server 104 includes a short message service/electronic mail message notification device 120 and an internet of things notification device 122. Server REST services device 106 includes a memory 130. Processor 110 may execute one or more applications, such as applications 140, 142, and 144. Memory 114 may store data associated with applications 140, 142, and 144 within a registry 146. While processor 110 and client windows service 112 are illustrated separately in FIG. 1, the processor may execute the operations described herein for the client windows service without varying from the scope of this disclosure. In an example, system 100 may include additional components over those in FIG. 1 without varying from the scope of this disclosure. Similarly, information handling system 102 may include additional components over those in FIG. 1 without varying from the scope of this disclosure.

During operation of information handling system 102, applications 140, 142, and 144 may receive updates for any particular purpose, such as for application security updates. In certain examples, the information handling system may reboot after an application has been updated. As the number of applications in an information handling system increases, the number of disruptive reboots after an application update may also increase. In previous information handling systems, application update prompts may be provided while an individual is using the information handling system. In this situation, the individual may select to postpone the update to a later time so that his or her work is not interrupted by the reboot. The next time the individual is using the information handling system, the individual may be prompted to perform the application update. However, the individual may again select not to perform the update to prevent the interruption of work. Thus in previous information handling systems, an individual may put off or delay the application updates for an extended period of time. This delay may pose a challenge to ensure that the updates are applied within a timely manner for security reasons. Information handling system 102 may be improved by processor 110 and client windows service 112 triggering an update request while the individual is using a registered secondary device, which in turn may prevent work downtime for the individual.

In an example, information handling system 102 may include any suitable number of applications, such as applications 140, 142, and 140. These applications may be any suitable type of application including, but not limited to, an electronic mail application, a virus scan application, a trusted device application, a data encryption application, and a performance optimizer application. In an example, an individual may register one or more devices as trusted devices, which may receive application update notifications. In certain examples, a list of trusted devices may be stored within a memory of cloud server 104 and may be associated with a unique entry to identify and associated the trusted devices with information handling system 102. Cloud server 104 may also store any data associated with the trusted devices to enable communication between the cloud server and the trusted devices. For example, if a trusted device is a cellular telephone of the individual, cloud server 104 may store the telephone number associated with the cellular telephone so that the application update notifications may be sent to the cellular telephone via short message service (SMS) messages. Cloud server 104 may also store an electronic mail message (email) address, which may be utilized to send the application update notifications to the individual associated with information handling system 102.

Processor 110 may perform one or more suitable operations to register one or all of applications 140, 142, and 144 with server REST services device 106. In an example, the registration and update for each of applications 140, 142, and 144 may be substantially similar. For clarity and brevity, the registration and update of an application will be described with respect to application 140. At operation 150, processor 110 may execute application 140 and perform an update registration request to client windows service. In an example, the update registration request may be performed via any suitable communication including, but not limited to, an application programming interface (API) call. At operation 152, client windows service 112 may provide the registration request for application 140 to server REST services device 106. In an example, the registration request may include any suitable information associated with application 140, such as an identification number for the application, a name of the application, a location of an update installer, or the like. At operation 154, server REST services device 106 may store the registration request information for application 140 in memory 130.

At operation 156, processor 110 may determine that application 140 requires an update, and based on this determined the processor may set a flag for the application in registry 146 of memory 114. In certain examples, processor 110 may set a corresponding flag in registry 146 for each of application based on that application requiring an update. In an example, registry 146 may include different fields for each of application 140, 142, and 144. At operation 158, client windows services 112, via processor 110, may poll registry 146 of memory 114 to determine if an update flag has been set for one or more of applications 140, 142, and 144. In an example, client windows service 112 may poll registry 146 at any suitable time including, but not limited to, during an idle time of information handling system 102, and at periodic intervals. In certain examples, an idle time of information handling system 102 may be detected based on any suitable criteria, such as when the information handling system is locked, when the information handling system is not in use, when the information handling system is outside configured active hours, or the like. In an example, the configured active hours may be set by a user preference.

In response to the update flag for application 140 being set in registry 146, client window services 112 may pull the registration information for the application from server REST services device 106 at operation 160. At operation 162, client windows service 112 may provide a notification request to cloud server 104. Client windows service 112 may provide the notification request during an idle time of information handling system 102. In an example, the notification request may include any suitable information to enable cloud server 104 to contact an individual associated with information handling system 102. For example, the notification request may include, but is not limited to, a list of trusted devices for notification, communication information for the trusted devices, and a contact order for the trusted devices.

Cloud server 104 may provide SMS/email notification 120 or an internet of things (IOT) notification 122 to the trusted device. In an example, cloud server 104 may determine whether to provide SMS/email notification 120 or IOT notification 122 based on information associated with each trusted device. Cloud server 104 may provide an update request notification to the first trusted device. If cloud server 104 does not receive a response from the first trusted device within a particular amount of time, the cloud server may send the update request to the next trusted device in the list of trusted device. In certain examples, the length of time cloud server 104 may wait until providing the update request to the next trusted device may varying based on the trusted device. For example, if the trusted device is a device connected via a SMS message, the amount of time may be less as compared to a trusted device connected via email.

In an example, cloud server 104 may continue sending the update request to the next trusted device in the list until a response is received within the particular amount of time. If cloud server 104 does not receive a response from any of the trusted devices, the cloud server may provide an update denial to client windows service 112 at operation 164. In another situation, if cloud server 104 receives a denial response from any of the trusted devices, the cloud server may provide an update denial to client windows service 112 at operation 164. In response to the update denial, client windows service 112 may wait until the next idle time of information handling system 102 to again provide the update request for application 140 to cloud server 104.

If cloud server 104 receives a proceed with update response from any of the trusted devices, the cloud server may provide a perform update notification to client windows service 112 at operation 164. In response to the perform update notification, client windows service 112 may perform an update, such as a software update, for each of applications 140, 142, and 144 with a corresponding update flag set in registry 146 at operation 166. In an example, one or more of the software updates may include a reboot of information handling system 102, which may be performed during the idle time of the information handling system. If the update is successful, client windows service 112 may update registry 146 to indicate that the update has been completed for each of applications 140, 142, and 144 that required an update at operation 168. In an example, the operation to update registry 146 may be any suitable operation including, but not limited to, clearing the update flag for application 140, 142, and/or 144, and setting a completion flag for the application.

In an example, based on operations 158-166 being performed during an idle time of information handling system 102, the individual associated with the information handling system may not have work interfered with to perform the update and the update may be performed in a timely manner. The next time the individual logs into information handling system 102, the update of application 140, 142, and/or 144 will have been applied based on the approval from the individual on a trusted device during the idle time of the information handling system.

Figure 2:
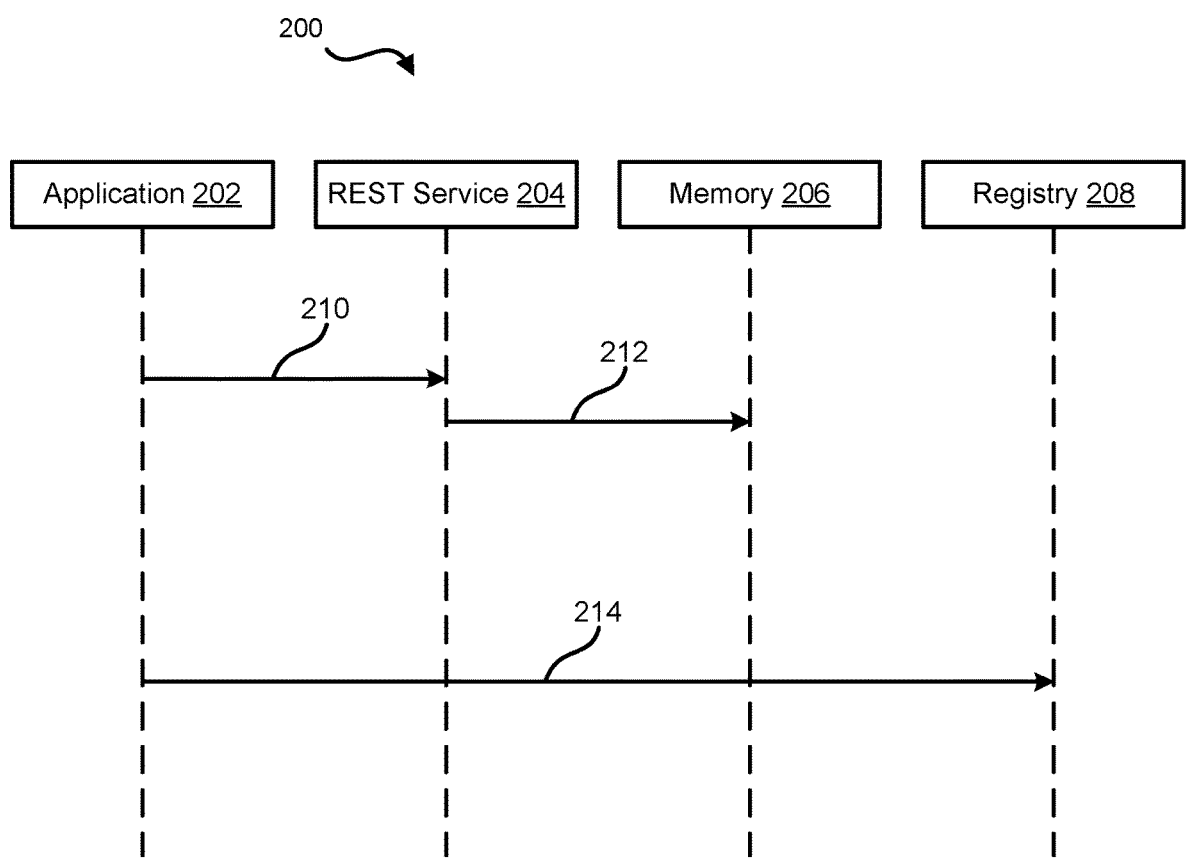
FIG. 2 is a flow diagram for registering an application for updates according to at least one embodiment of the present disclosure.

FIG. 2 illustrates a flow diagram of a method 200 for registering an application for updates according to at least one embodiment of the present disclosure. Method 200 may be performed by devices or operations including, but not limited to, application 202, REST service 204, memory 206, and registry 208. In an example, any step of method 200 may also be performed by one of the components in FIG. 1 without varying from the scope of this disclosure.

At operation 210, application 202 may register with REST service 204. In an example, the registration may include any suitable information associated with application 202 including, but not limited to, an identification number for the application, a name of the application, a location of an update installer, or the like. In an example, operation 210 may be split into two separate operations. For example, application 202 may provide an update registration request to a client windows service, which in turn may provide the registration request to REST service 204.

At operation 212, REST service 204 may store the registration request information for application 140 in memory 206. In an example, memory 206 may be located within REST service 204, and the memory may be any suitable type of persistent memory device. At operation 214, if application 202 receives an update packet, the application may update registry 208 to indicate that an update is available for the application. In response to operation 214, method 300 of FIG. 3 may be performed according to at least one embodiment of the present disclosure.

Figure 3:
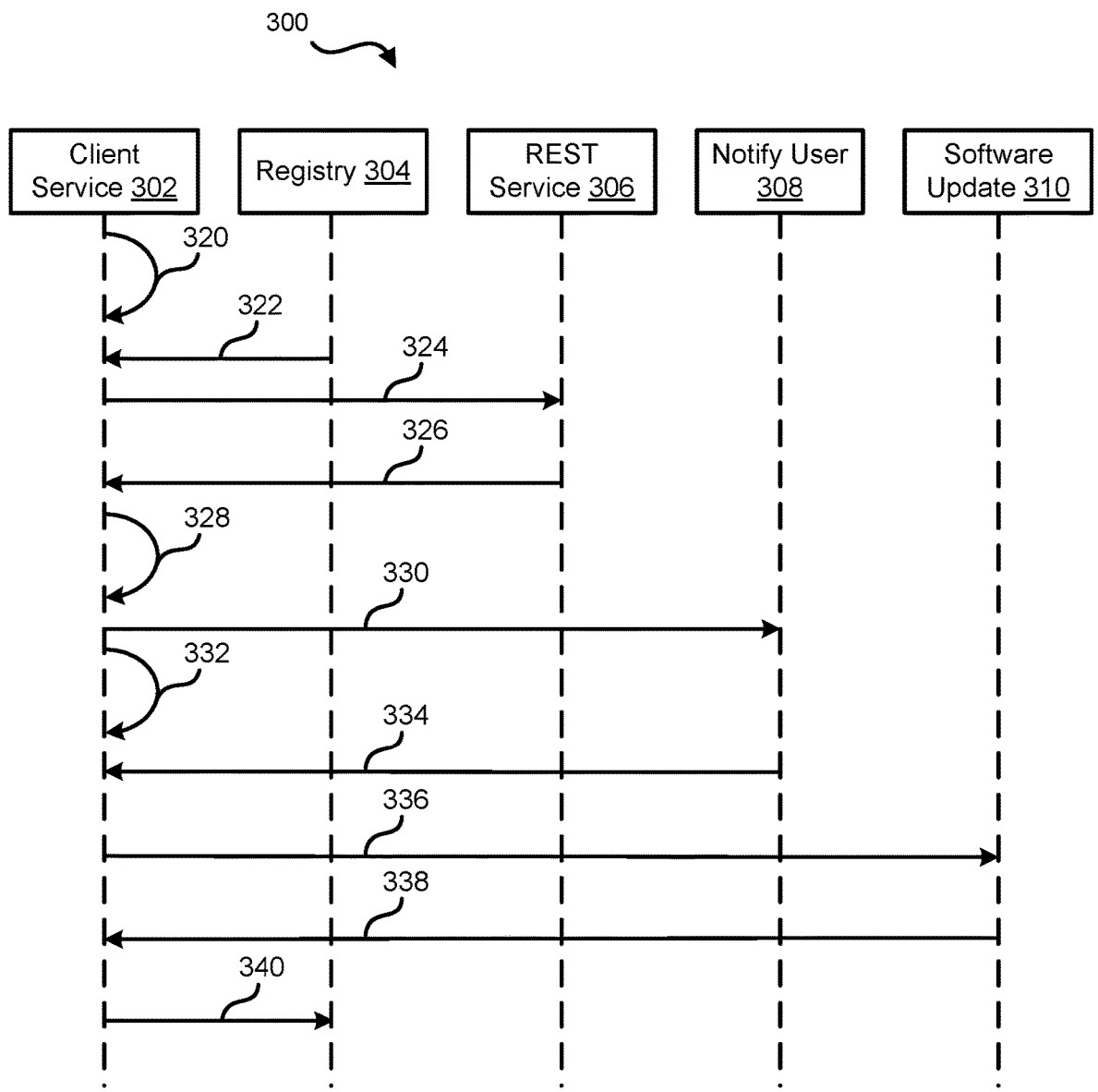
FIG. 3 is a flow diagram for a sequence of updating an application according to at least one embodiment of the present disclosure.

FIG. 3 illustrates a flow diagram of a method 300 for a sequence of updating an application according to at least one embodiment of the present disclosure. Method 200 may be performed by devices or operations including, but not limited to, client service 302, registry 304, REST service 306, notify user 308, and software update 310. In an example, any step of method 300 may also be performed by one of the components in FIG. 1 without varying from the scope of this disclosure.

At operation 320, client services 302 may poll registry 304 to determine if an update flag has been set for one or more of applications. In an example, client service 302 may poll registry 304 at periodic intervals. In response to an update flag for monitored application being set in registry 304, a notification may be provided to client services 302 at operation 322. In response to the update flag for the monitored application being set in registry 304, client services 302 may request registration information for the application from REST service 306 at operation 324. At operation 326, REST service 306 may provide the registration information to client service 302.

At operation 328, client service 302 may determine whether an idle time for the information handling system is detected. In certain examples, an idle time of the information handling system may be detected based on any suitable criteria, such as when the information handling system is locked, when the information handling system is not in use, when the information handling system is outside configured active hours, or the like. In an example, the configured active hours may be set by a user preference. At operation 330, client service 302 may notify a user 308 that an application is ready to be updated of the information handling system. In an example, the user may be notified in any suitable manner. For example, client service 302 may provide a notification request to a cloud server, which in turn may notify user 308 via one of a number of trusted devices. In an example, the notification request may include any suitable information to enable the cloud server to contact the user associated with the information handling system. For example, the notification request may include, but is not limited to, a list of trusted devices for notification, communication information for the trusted devices, and a contact order for the trusted devices.

At operation 332, client service 302 may wait for an update confirmation from the user. If the user confirms the update, an update confirmation may be provided to client service 302 at operation 334. At operation 336, client service 302 may perform an update, such as a software update, for all the applications that require an update based on a status of corresponding update flags in registry 304. In an example, the software update may include a reboot of the information handling system, which may be performed during the idle time of the information handling system. If the update is successful, client service may receive an update success notification at operation 338. At operation 340, client service 302 may update registry 304 to indicate that the update has been completed for the application. In an example, the operation to update registry 304 may be any suitable operation including, but not limited to, clearing the update flag for the application, and setting a completion flag for the application.

Figure 4:
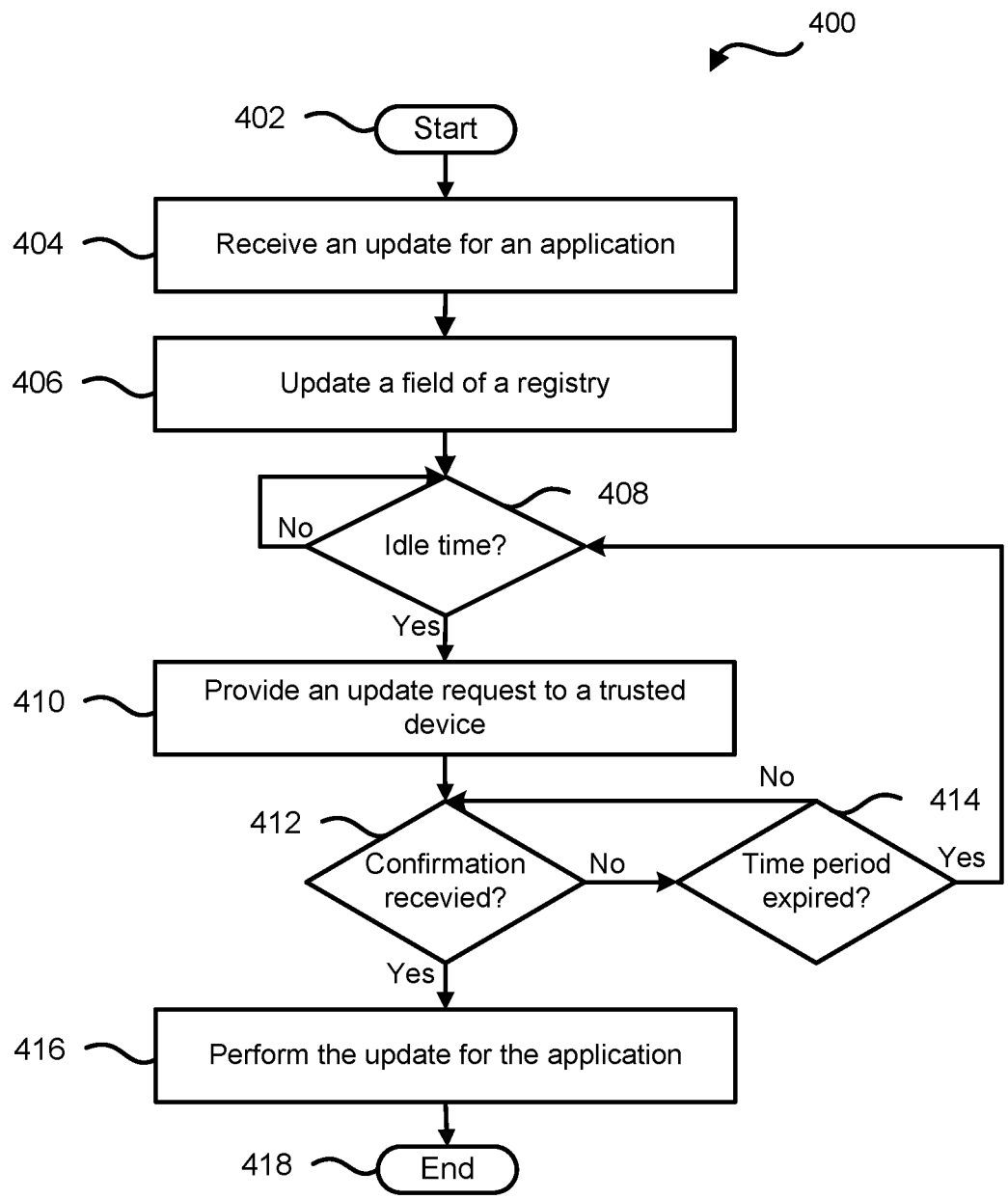
FIG. 4 is a flow diagram of a method for updating an application during an idle time of an information handling system according to at least one embodiment of the present disclosure.

FIG. 4 illustrates a flow diagram of a method 400 for updating an application during an idle time of an information handling system according to at least one embodiment of the present disclosure, starting at block 402. It will be readily appreciated that not every method step set forth in this flow diagram is always necessary, and that certain steps of the methods may be combined, performed simultaneously, in a different order, or perhaps omitted, without varying from the scope of the disclosure. FIG. 4 may be employed in whole, or in part, processor 110 of FIG. 1, or any other type of controller, device, module, processor, or any combination thereof, operable to employ all, or portions of, the method of FIG. 4.

At block 404, an update for an application is received. In an example, the update may be received by a processor of an information handling system executing the application. At block 406, a field in a registry is updated to indicate that the update is available for the application. In an example, the registry may include multiple fields for different applications in the information handling system. At block 408, a determination is made whether the information handling system is in an idle time. In certain examples, an idle time of the information handling system may be detected based on any suitable criteria, such as when the information handling system is locked, when the information handling system is not in use, when the information handling system is outside configured active hours, or the like. In an example, the configured active hours may be set by a user preference.

In response to the idle time being detected, an update request is provided to a trusted device at block 410. In an example, the trusted device may be one of multiple trusted devices identified by an individual associated with the information handling system. At block 412, a determination is made whether an update request confirmation has been received from the trusted device. If the update request confirmation has not been received, a determination is made whether a time period has expired at block 414. If the time period has not expired the flow continues at block 412. If the time period has expired, the flow continues as described above at block 408. In response to the update request confirmation being received, the updates for all applications requiring an update are performed at block 416 and the flow ends at block 418. In an example, the update may include a reboot of the information handling system during the idle time.

Figure 5:
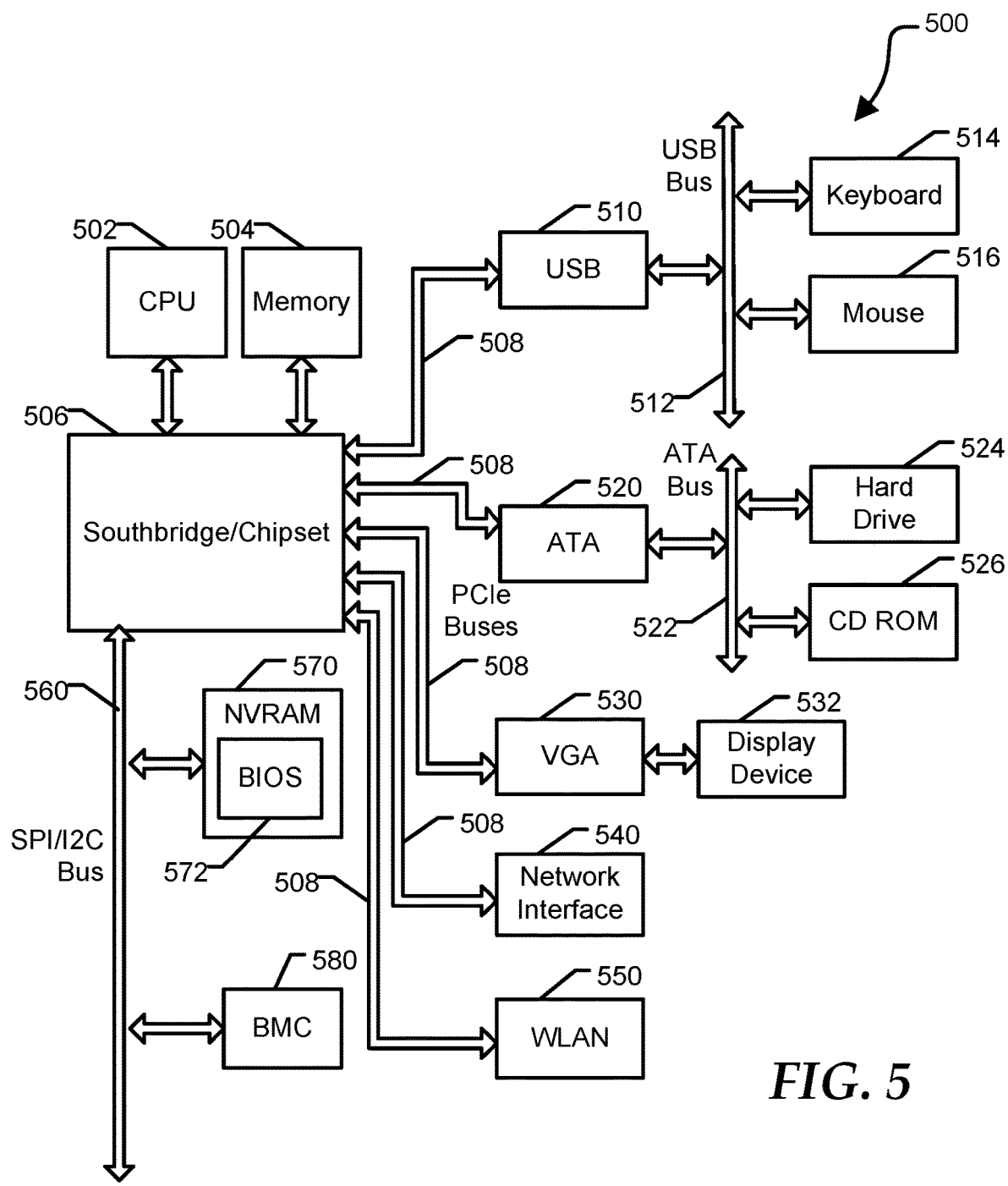
FIG. 5 is a block diagram of a general information handling system according to an embodiment of the present disclosure.

FIG. 5 illustrates a general information handling system 500. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 500 including a processor 502, a memory 504, a southbridge/chipset 506, one or more PCIe buses 508, a universal serial bus (USB) controller 510, a USB 512, a keyboard device controller 514, a mouse device controller 516, a configuration an ATA bus controller 520, an ATA bus 522, a hard drive device controller 524, a compact disk read only memory (CD ROM) device controller 526, a video graphics array (VGA) device controller 530, a network interface controller (NIC) 540, a wireless local area network (WLAN) controller 550, a serial peripheral interface (SPI) bus 560, a NVRAM 570 for storing BIOS 572, and a baseboard management controller (BMC) 580. In an example, chipset 506 may be directly connected to an individual end point via a PCIe root port within the chipset and a point-to-point topology as shown in FIG. 5. BMC 580 can be referred to as a service processor or embedded controller (EC). Capabilities and functions provided by BMC 580 can vary considerably based on the type of information handling system. For example, the term baseboard management system is often used to describe an embedded processor included at a server, while an embedded controller is more likely to be found in a consumer-level device. As disclosed herein, BMC 580 represents a processing device different from CPU 502, which provides various management functions for information handling system 500. For example, an embedded controller may be responsible for power management, cooling management, and the like. An embedded controller included at a data storage system can be referred to as a storage enclosure processor.

System 500 can include additional processors that are configured to provide localized or specific control functions, such as a battery management controller. Bus 560 can include one or more busses, including a SPI bus, an I2C bus, a system management bus (SMBUS), a power management bus (PMBUS), and the like. BMC 580 can be configured to provide out-of-band access to devices at information handling system 500. As used herein, out-of-band access herein refers to operations performed prior to execution of BIOS 572 by processor 502 to initialize operation of system 500.

BIOS 572 can be referred to as a firmware image, and the term BIOS is herein used interchangeably with the term firmware image, or simply firmware. BIOS 572 includes instructions executable by CPU 502 to initialize and test the hardware components of system 500, and to load a boot loader or an operating system (OS) from a mass storage device. BIOS 572 additionally provides an abstraction layer for the hardware, such as a consistent way for application programs and operating systems to interact with the keyboard, display, and other input/output devices. When power is first applied to information handling system 500, the system begins a sequence of initialization procedures. During the initialization sequence, also referred to as a boot sequence, components of system 500 are configured and enabled for operation, and device drivers can be installed. Device drivers provide an interface through which other components of the system 500 can communicate with a corresponding device.

Information handling system 500 can include additional components and additional busses, not shown for clarity. For example, system 500 can include multiple processor cores, audio devices, and the like. While a particular arrangement of bus technologies and interconnections is illustrated for the purpose of example, one of skill will appreciate that the techniques disclosed herein are applicable to other system architectures. System 500 can include multiple CPUs and redundant bus controllers. One or more components can be integrated together. For example, portions of southbridge/chipset 506 can be integrated within CPU 502. Additional components of information handling system 500 can include one or more storage devices that can store machine-executable code, one or more communications ports for communicating with external devices, and various input and output (I/O) devices, such as a keyboard, a mouse, and a video display. An example of information handling system 500 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

In an example, information handling system 500 may be any suitable device including, but not limited to, information handling system 102 of FIG. 1. Information handling system 500 can include a set of instructions that can be executed to cause the information handling system to perform any one or more of the methods or computer based functions disclosed herein. The information handling system 500 may operate as a standalone device or may be connected to other computer systems or peripheral devices, such as by a network.

In a networked deployment, the information handling system 500 may operate in the capacity of a server or as a client user computer in a server-client user network environment, or as a peer computer system in a peer-to-peer (or distributed) network environment. The information handling system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single information handling system 500 is illustrated, the term "system" shall also be taken to include any collection of systems or sub-systems that individually or jointly execute a set, or multiple sets, of instructions to perform one or more computer functions.

The information handling system 500 can include a disk drive unit and may include a computer-readable medium, not shown in FIG. 5, in which one or more sets of instructions, such as software, can be embedded. Further, the instructions may embody one or more of the methods or logic as described herein. In a particular embodiment, the instructions may reside completely, or at least partially, within system memory 504 or another memory included at system 500, and/or within the processor 502 during execution by the information handling system 500. The system memory 504 and the processor 502 also may include computer-readable media.

While the computer-readable medium 536 of information handling system 500 is shown in FIG. 5 to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory.

Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
receiving, by a processor of an information handling system, at least one update for at least one application of a plurality of applications;
in response to the at least one update being received, updating at least one field of a plurality of fields in a registry to indicate that the at least one update is available for the at least one application;
based on the at least one of the fields being updated, determining an idle time of the information handling system; and
during the idle time:
providing an update request to a trusted device;
determining whether a time period for response from the trusted device has expired;
in response to the time period having expired, providing the update request to a next trusted device in a list of trusted devices;
determining whether an update request confirmation has been received from the trusted device or the next trusted device; and
in response to the update request confirmation being received, performing updates for each of the applications requiring an update.

2. The method of claim 1, further comprising: registering a plurality of trusted devices including the trusted device for the information handling system; and storing the list of the trusted devices and communication information for each of the trusted devices.

3. The method of claim 1, wherein the time period changes based on a type of device of the trusted device.

4. The method of claim 1, further comprising: in response to an update request denial being received, determining when a next idle time of the information handling system occurs; and during the next idle time: providing the update request to the trusted device; determining whether the update request confirmation has been received from the trusted device; and in response to the update request confirmation being received, performing the updates for the each of the applications requiring an update.

5. The method of claim 1, further comprising: in response to the updates for the each of the applications being completed, updating the at least one of the fields of the registry to indicate that the updates for the each of the applications have been completed.

6. The method of claim 5, further comprising: setting at least one update flag in the at least one of the fields to indicate that the at least one update is available for the at least one application; and clearing the at least one update flag in the at least one of the fields to indicate that the at least one update for the at least one application has been completed.

7. The method of claim 1, wherein the updating for the each of the applications requiring the update further comprises: rebooting the information handling system during the idle time of the information handling system.

8. An information handling system comprising:
a memory to store a registry with a plurality of fields for a plurality of applications executed in the information handling system; and
a processor to communicate with the memory, the processor configured to:
receive at least one update for at least one of the applications, wherein each update is for a different application;
in response to the at least one update being received, update at least one of the fields of the registry to indicate that the at least update is available for the at least one application, wherein each of the fields of the registry is associated with a different application;
based on the at least one of the fields being updated, determine an idle time of the information handling system; and
during the idle time:
provide an update request to a trusted device;
determine whether a time period for response from the trusted device has expired;
in response to the time period having expired, provide the update request to a next trusted device in a list of trusted devices;
determine whether an update request confirmation has been received from the trusted device or the next trusted device; and
in response to the update request confirmation being received, perform updates for each of the applications requiring an update.

9. The information handling system of claim 8, wherein the processor is further configured to:
register a plurality of trusted devices including the trusted device for the information handling system; and
store the list of the trusted devices and communication information for each of the trusted devices.

10. The information handling system of claim 8, wherein the time period changes based on a type of device of the trusted device.

11. The information handling system of claim 8, wherein the processor is further configured to:
in response to an update request denial being received, determine when a next idle time of the information handling system occurs; and
during the next idle time: provide the update request to the trusted device; determine whether the update request confirmation has been received from the trusted device; and in response to the update request confirmation being received, perform the updates for the each of the applications requiring an update.

12. The information handling system of claim 8, wherein the processor is further configured to:
in response to the updates for the each of the applications being completed, update the at least one of the fields of the registry to indicate that the updates for the each of the applications have been completed.

13. The information handling system of claim 12, wherein the processor is further configured to:
set at least one update flag in the at least one of the fields to indicate that the at least one update is available for the at least one of the applications; and clear the at least one update flag in the at least one of the fields to indicate that the at least one update for the at least one of the applications has been completed.

14. The information handling system of claim 8, wherein the at least one update for the at least one of the applications includes the processor is further configured to reboot the information handling system during the idle time of the information handling system.

15. An information handling system comprising:
a memory to store a registry with a plurality of fields for a plurality of applications executed in the information handling system; and
a processor to communicate with the memory, the processor configured to:

register a plurality of trusted devices including a first trusted device for the information handling system;
receive at least one update for at least one application of the applications;
in response to the update being received, update at least one of the fields of the registry to indicate that the at least one update is available for the at least one application of the applications;
based on the at least one of the fields being updated, determine an idle time of the information handling system; and
during the idle time:
provide an update request to the first trusted device;
determine whether a time period for response from the trusted device has expired in response to the time period having expired, provide the update request to a next trusted device in a list of trusted devices determine whether an update request confirmation has been received from the first trusted device or the next trusted device;
in response to the update request confirmation being received, perform updates for each of the applications requiring an update; and
in response to the updates for the each of the applications requiring an update being completed, reboot the information handling system during the idle time of the information handling system.

16. The information handling system of claim 15, wherein the processor is further configured to:
in response to an update request denial being received, determine when a next idle time of the information handling system occurs; and during the next idle time: provide the update request to the trusted device; determine whether the update request confirmation has been received from the trusted device; and in response to the update request confirmation being received, perform the updates for the each of the applications requiring an update.

17. The information handling system of claim 15, wherein the processor is further configured to in response to the updates for the each of the application requiring an update being completed, update the at least one of the fields of the registry to indicate that the at least one update for the at least one application has been completed.

\* \* \* \* \*